United States Patent [19]

Bradshaw

[11] 4,331,690

[45] May 25, 1982

[54] TREATMENT OF FOODSTUFFS

[75] Inventor: William Bradshaw, Clitheroe, England

[73] Assignee: Tweedy of Burnley Limited, Burnley, England

[21] Appl. No.: 166,742

[22] Filed: Jul. 7, 1980

Related U.S. Application Data

[63] Continuation of Ser. No. 937,177, Aug. 28, 1978, abandoned, which is a continuation of Ser. No. 737,158, Oct. 29, 1976, abandoned, which is a continuation of Ser. No. 557,071, Mar. 10, 1975, abandoned, which is a continuation-in-part of Ser. No. 323,134, Jan. 12, 1973, abandoned.

[30] Foreign Application Priority Data

Jan. 14, 1972 [GB] United Kingdom ............... 1859/72
Apr. 20, 1972 [GB] United Kingdom ............. 18265/72
Sep. 13, 1972 [GB] United Kingdom ............. 42453/72

[51] Int. Cl.³ .............................................. A21D 6/00
[52] U.S. Cl. ................................. 426/233; 426/497; 426/523; 426/524
[58] Field of Search ............... 426/465, 496, 497, 505, 426/520, 523, 524, 549, 231, 233, 618, 622; 34/15; 62/100, 268; 99/472

[56] References Cited

U.S. PATENT DOCUMENTS

| 102,302 | 4/1870 | Munroe | 426/523 |
|---|---|---|---|
| 1,076,464 | 10/1913 | Stiriz | 426/497 |
| 1,668,591 | 5/1928 | Hoyt | 34/15 |
| 2,021,772 | 11/1935 | Fleisher | 34/15 |
| 2,114,595 | 4/1938 | Fennema | 34/15 |
| 2,203,638 | 6/1940 | Smaltz | 426/523 |
| 4,115,596 | 9/1978 | Knutrud | 426/497 |

FOREIGN PATENT DOCUMENTS

| 487769 | 12/1929 | Fed. Rep. of Germany. | |
|---|---|---|---|
| 1368503 | 6/1964 | France. | |
| 7500580 | 7/1975 | Norway | 426/497 |
| 132670 | 12/1975 | Norway | 426/497 |
| 2382 | of 1877 | United Kingdom | 426/496 |
| 459829 | 6/1937 | United Kingdom | 34/15 |
| 479715 | 2/1938 | United Kingdom. | |
| 539477 | 9/1941 | United Kingdom. | |
| 762677 | 12/1956 | United Kingdom. | |
| 821369 | 10/1959 | United Kingdom. | |
| 1413481 | 11/1975 | United Kingdom | 426/497 |
| 1413482 | 11/1975 | United Kingdom | 426/497 |

OTHER PUBLICATIONS

Theory and Application of Food Freezing (1959) pp. 261-263.

Primary Examiner—Ernest G. Therkorn
Attorney, Agent, or Firm—John Remon Wenzel

[57] ABSTRACT

Rapid cooling of a freshly baked moisture-containing farinaceous foodstuff article such as bread, wherein the article at its baked temperature and without deliberate pre-cooling is submitted to a reduced pressure treatment, which is applied at a plurality of rates so that on the one hand the article is not disintegrated, and on the other hand the article does not suffer an unacceptable peripheral moisture loss. The change of rate of application of the reduced pressure may be effected in response to various parameters.

Also production of completely baked moisture-containing foodstuff articles by heating to a pre-determined internal temperature, terminating the heating substantially prior to the known, normal, complete baking time for the article and submitting the article to reduced pressure treatment.

10 Claims, 29 Drawing Figures

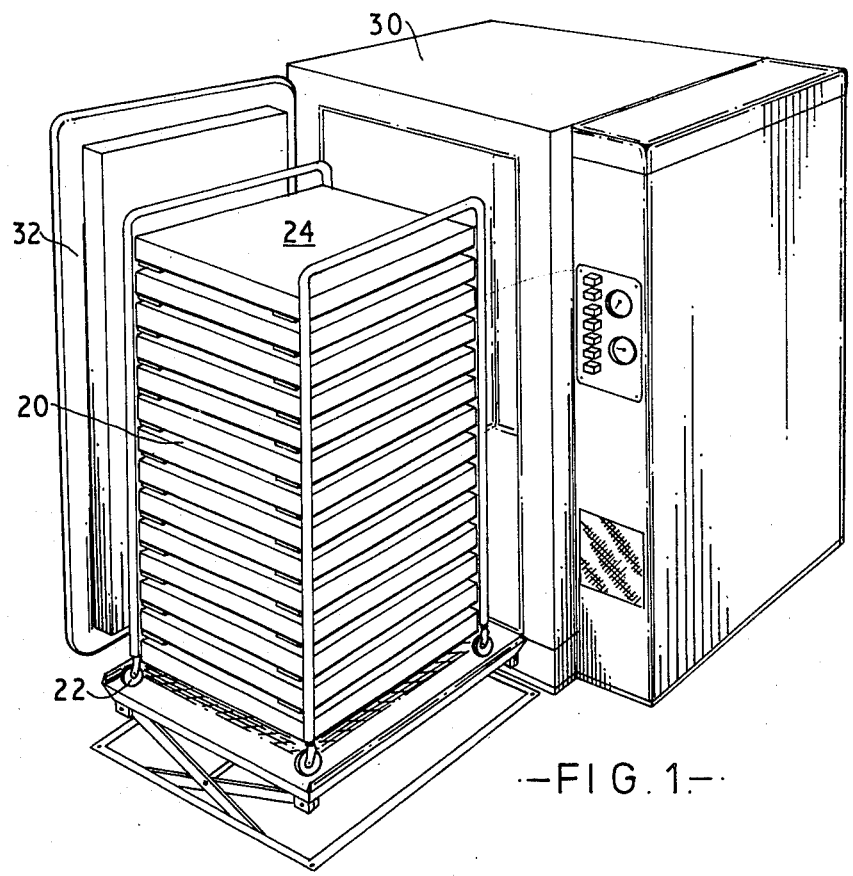
—FIG.1—
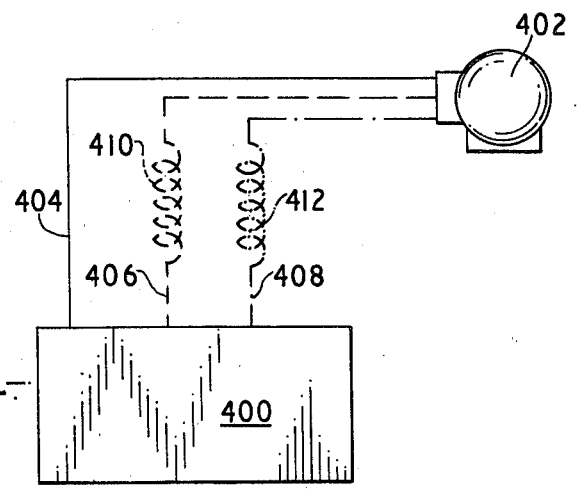
—FIG.14—

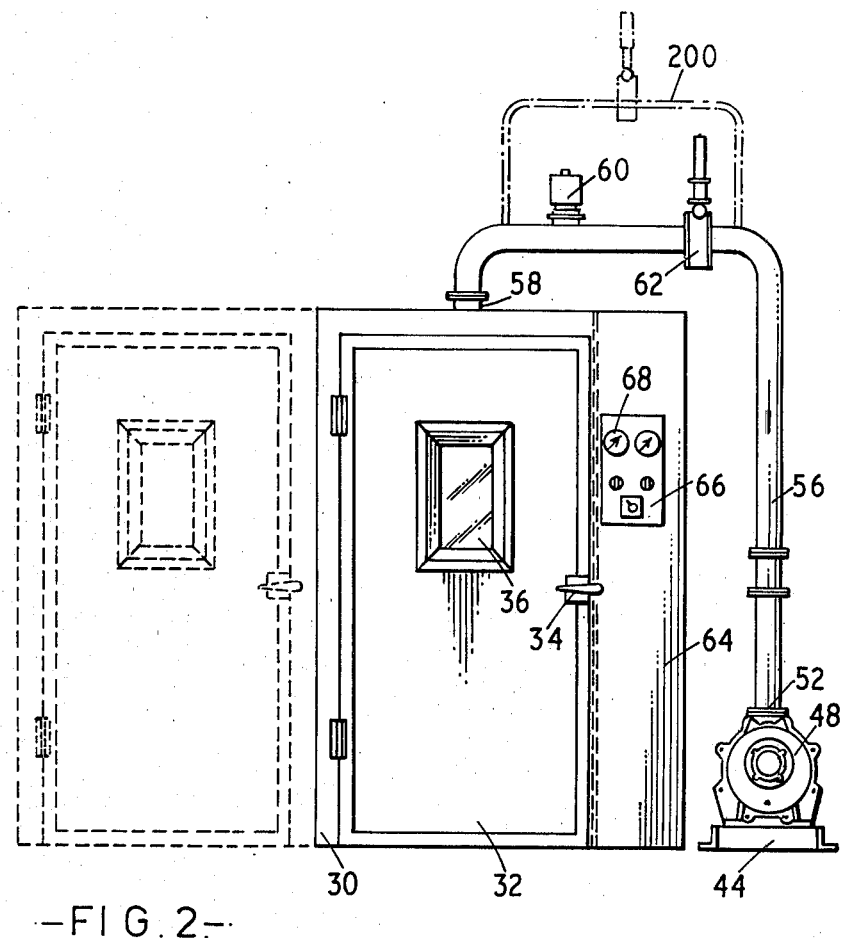
-FIG.2-
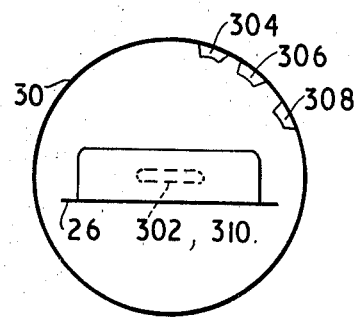
-FIG.12-

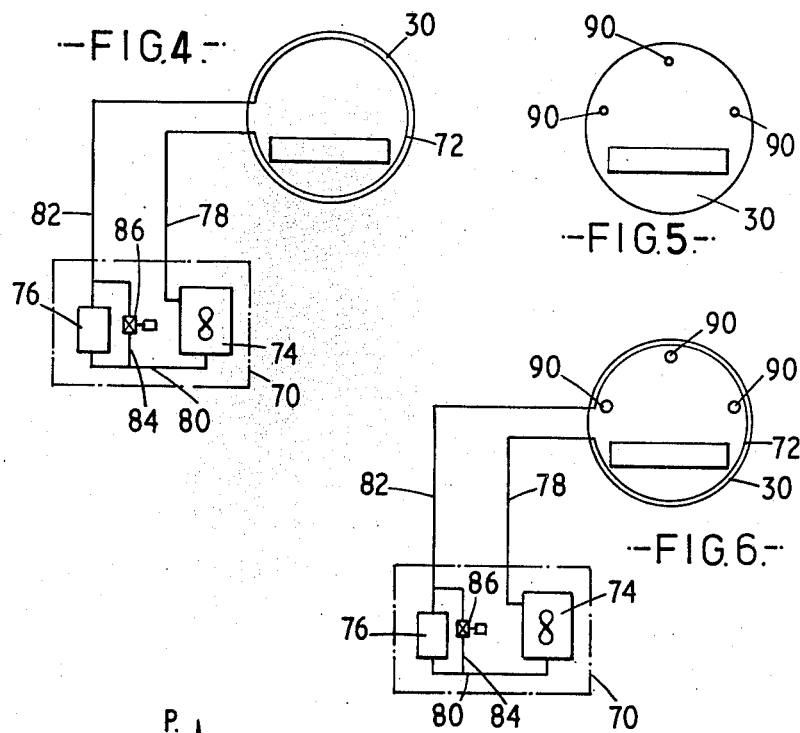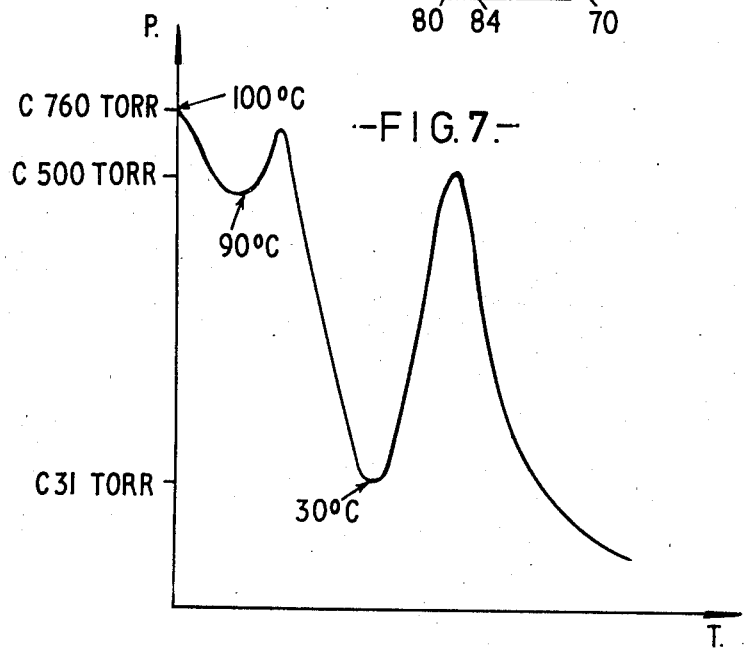

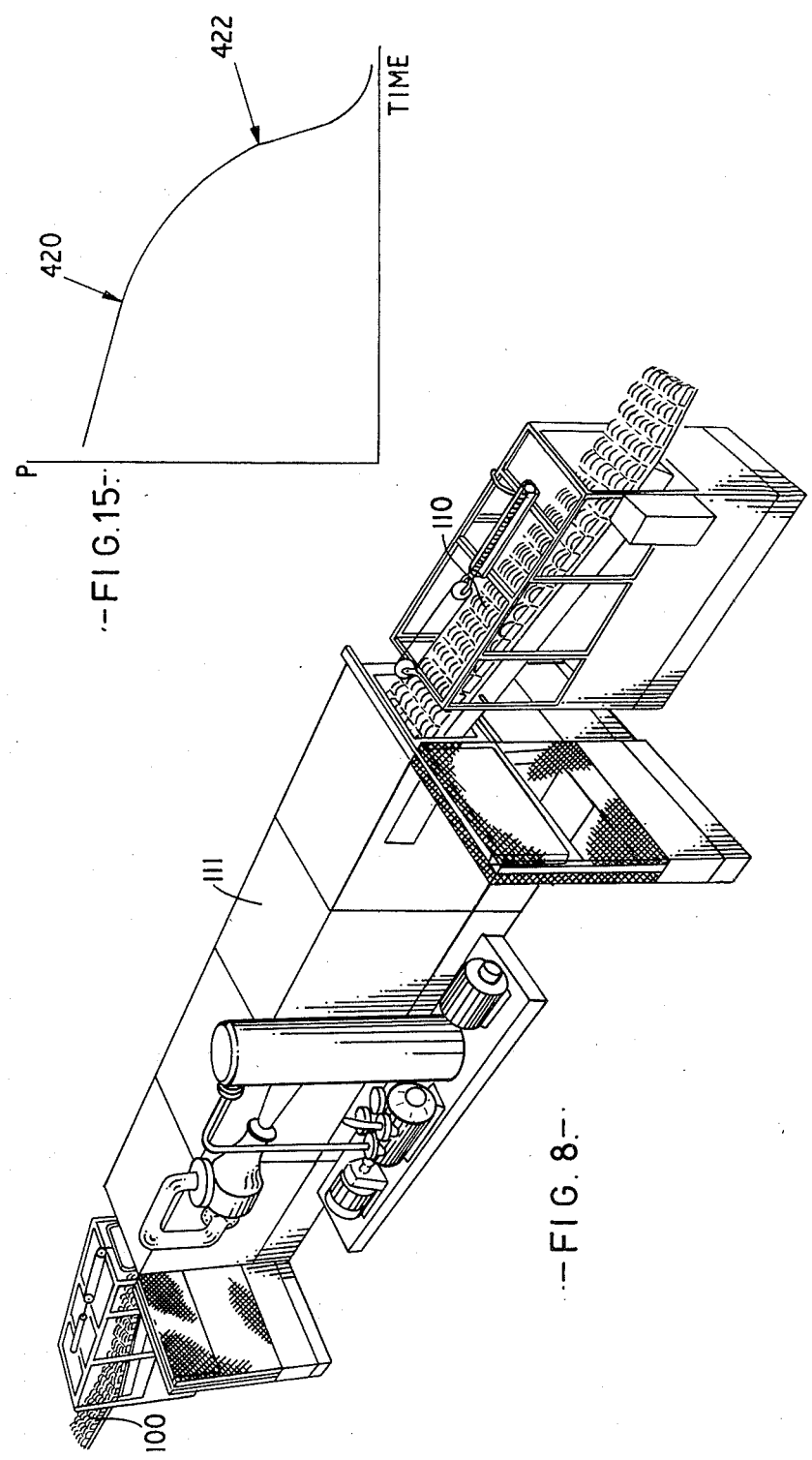

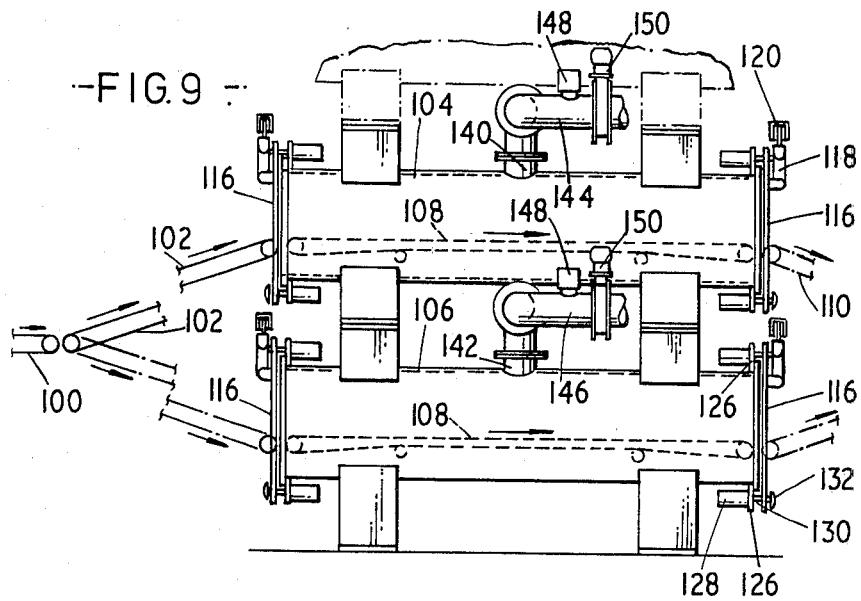
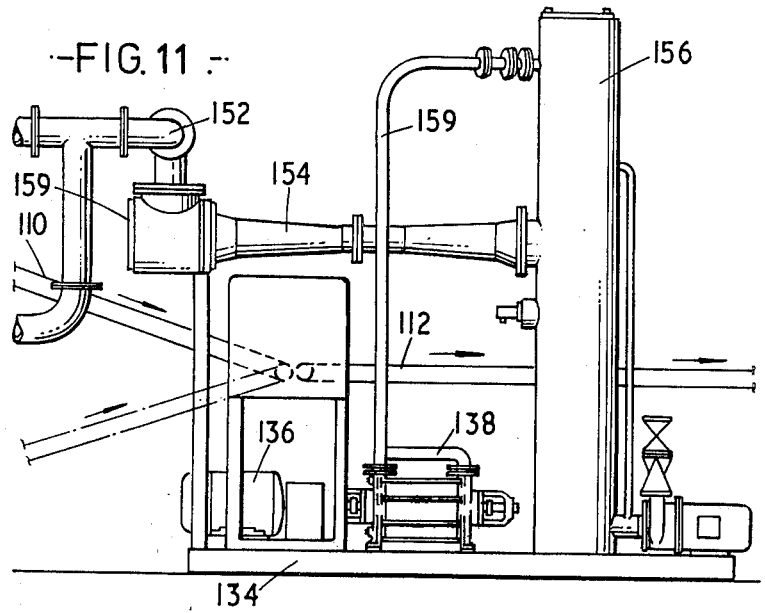

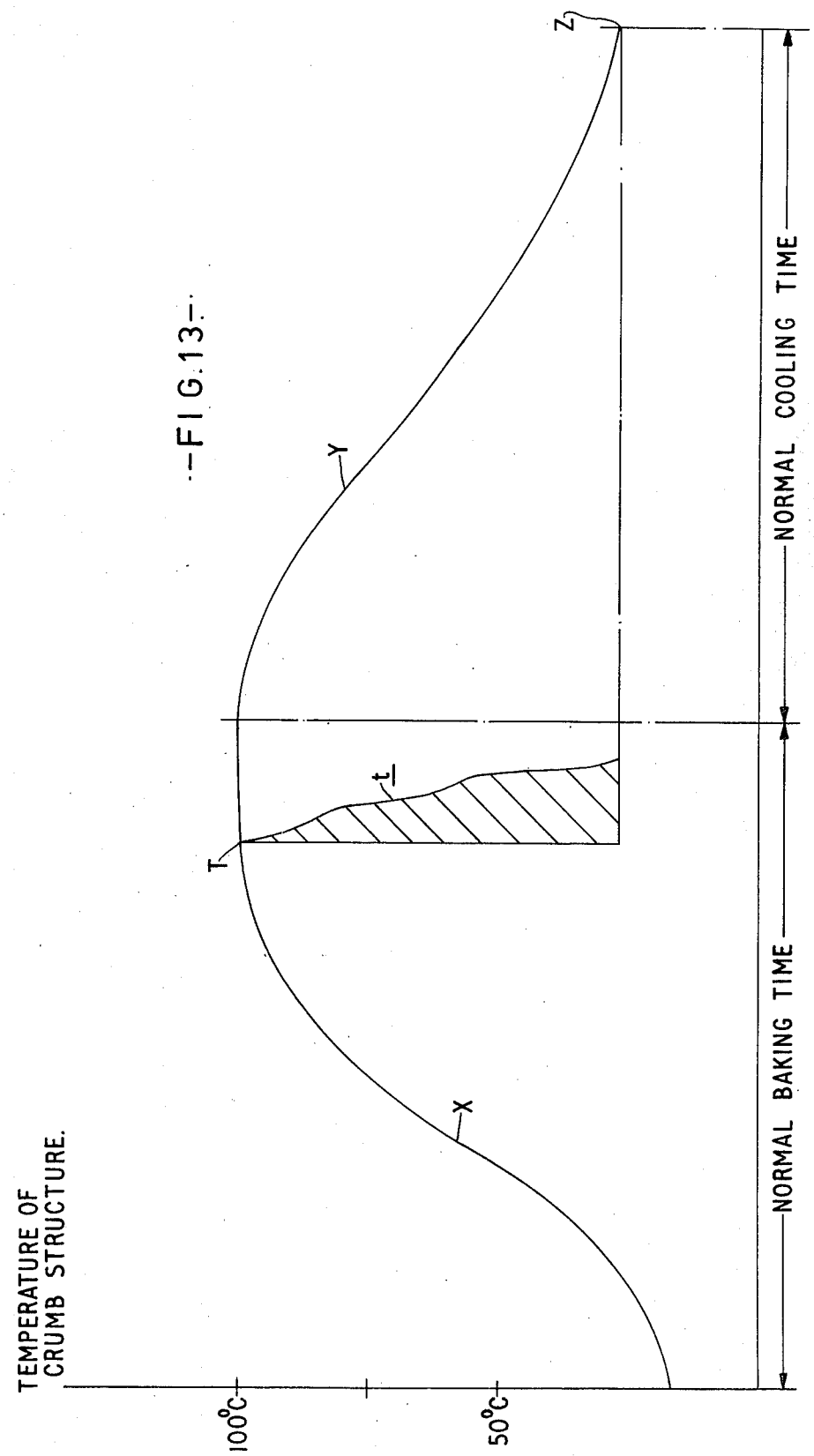

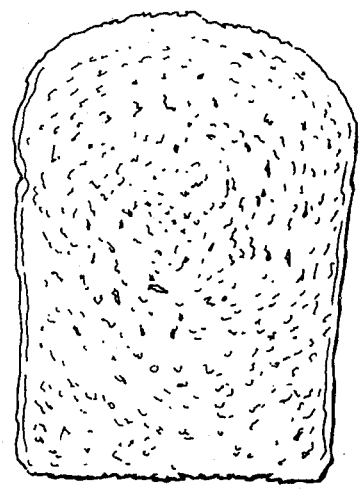
-FIG 16d-
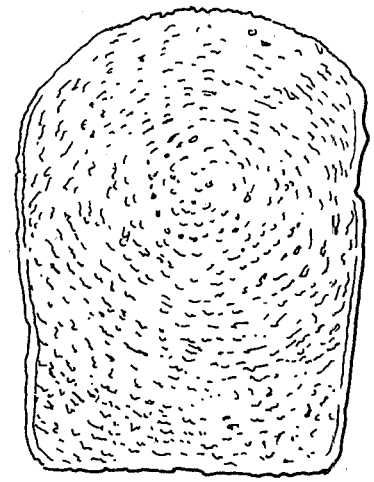
-FIG.16e-
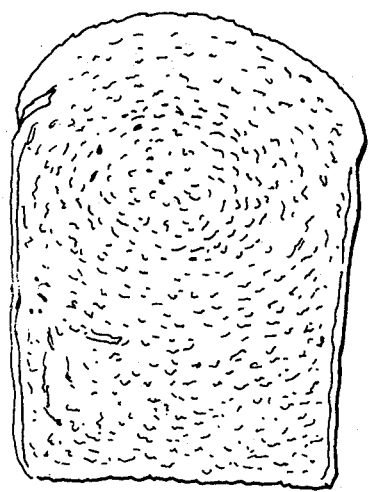
-FIG.16f-

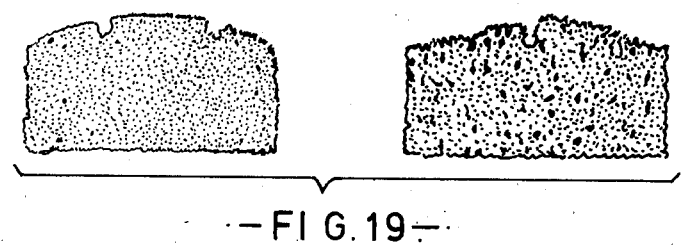
—FIG. 19—
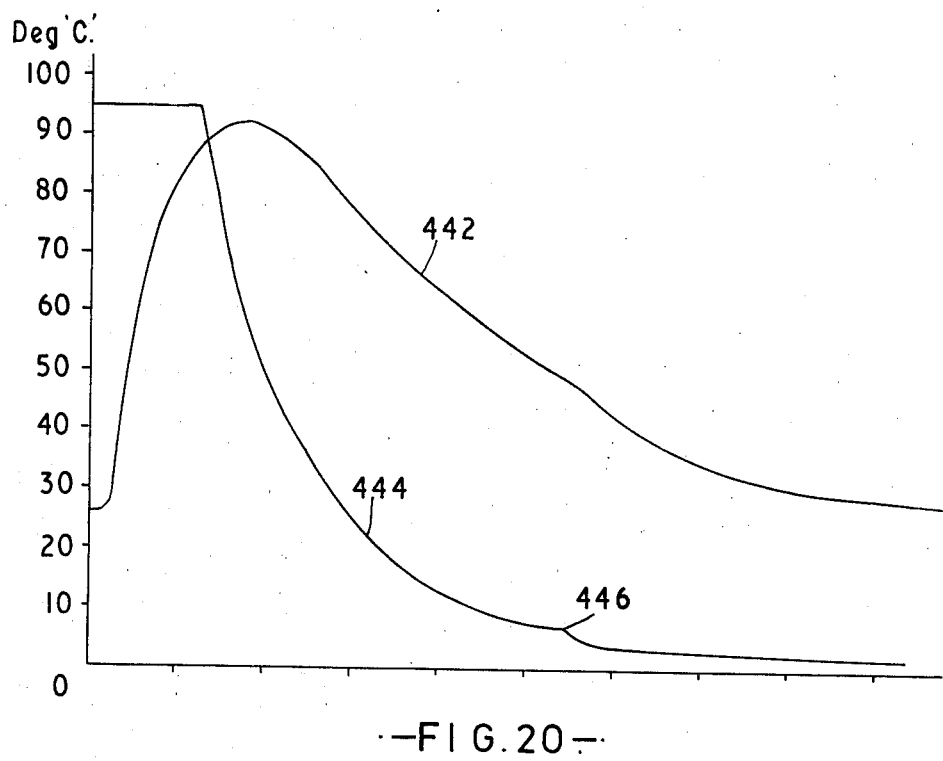
—FIG. 20—

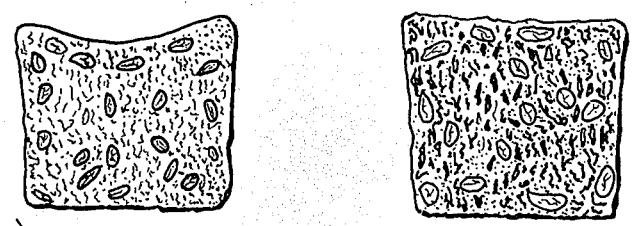
—FIG. 21—
—FIG. 22—
—FIG. 23—
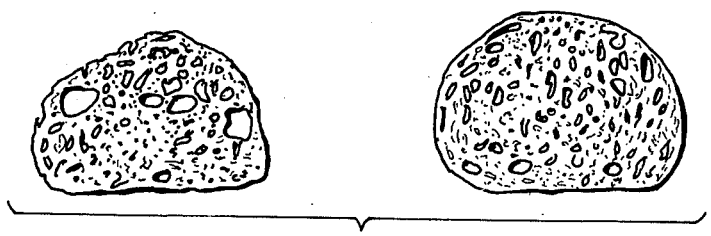
—FIG. 24—

TREATMENT OF FOODSTUFFS

CROSS REFERENCE TO RELATED APPLICATION

This is a continuation of application Ser. No. 937,177, filed Aug. 28, 1978, which was a continuation of Ser. No. 737,158, filed Oct. 29, 1976, which was a continuation of Ser. No. 557,071, filed Mar. 10, 1975, which was a continuation-in-part of Ser. No. 323,134, filed Jan. 12, 1973, all now abandoned.

GENERAL BACKGROUND TO THE INVENTION

The invention relates to the rapid cooling of moisture containing farinaceous foodstuff articles, such as bread, piecrusts and the like, using reduced pressure techniques.

The invention further relates to the production of a completely baked moisture-containing farinaceous foodstuff article, which makes use of a reduced pressure technique.

There are many instances in the food industry, where a foodstuff article is subjected to a heating process and it is then necessary to allow the article to cool before the next stage in handling it. Taking as a specific instance baked farinaceous foodstuffs, when those are removed from the oven, it is necessary to allow them to cool before processing such as wrapping, or, in the case of bread, slicing. Bread for example, may be at approximately 100° C. in the crumb structure at the core when removed from the oven, but must be allowed to cool to below 30° C. before slicing and wrapping. The cooling process is very time consuming - between two and three hours for ordinary bakers loaves - and also requires considerable storage space in the bakery for the product which is at the cooling stage. Besides the cooling process being time consuming, the apparatus required for cooling is bulky and expensive.

It will be appreciated that if the article at a given temperature is subjected to a reduced pressure, by which is meant a pressure lower than normal atmospheric pressure, the temperature of the article will exceed the boiling point of the moisture at that pressure, and there will be evaporation of moisture. The latent heat of evaporation is thus extracted from the article.

It has been proposed to cool bread by a two-stage process, which involves, first deliberately allowing the bread to cool in the conventional manner and then subjecting it to a vacuum. Clearly this would only partially improve the conventional process, because it still requires a relatively long pre-cooling period, before the vacuum treatment commences. Even more serious however is the fact that the prior proposal does not include any control over the application of the vacuum.

Obviously it is desirable to cool the article as quickly as possible, but if the pressure is reduced too rapidly, the moisture attempting to escape from the core of the article causes physical disintegration of the article. On the other hand, if the vacuum is applied at a slower rate, than in order to cope with the vapour emitted by the article, the reduced pressure treatment has to be prolonged, and with some products this creates a moisture denuded peripheral layer.

It has also been proposed to submit bread to a deliberate pre-cooling period after it has left the oven, to allow it to attain a temperature of about 135° F. (58° C.), and then to apply a two-stage vacuum treatment. This offers only a partial solution to the problem of time and space saving, because it is still necessary to leave the product for a considerable time - perhaps one hour - before the vacuum cooling can commence.

Although there may be some baked articles wherein the moisture can be allowed to escape as rapidly as possible, without detracting from the properties of the article, it will usually be found that the sudden application of a very low pressure would cause the article to disintegrate or explode. However, it must be appreciated that moisture is present in most baked farinaceous articles in two forms, namely molecular bound moisture - usually $H_2O$ - which is chemically or physically combined with some other element(s) in the article and "free" moisture which is not chemically combined. The expression "molecular bound" is used in preference to "chemically combined" because to some extent the process of removing the moisture from the molecules is reversible. Now clearly if the reduced pressure treatment is carried to the point where some or all of the molecular bound moisture is released, the article will undergo a physical and/or chemical change, which will be deleterious, and will probably destroy it as a commercial article.

The problem which the present invention sets out to solve is to reduce the cooling time of baked moisture-containing farinaceous foodstuff articles without on the one hand disintegrating the article, and on the other hand creating a water-denuded boundary layer in the article.

It has also been found that the invention can be used to produce a completely baked moisture-containing farinaceous foodstuff article in a reduced time.

SUMMARY OF THE INVENTION

According to one aspect of this invention a method of rapidly cooling a freshly baked, moisture containing farinaceous foodstuff article comprises the steps of promptly submitting the article at its baked temperature without deliberate pre-cooling to a reduced pressure treatment, so that substantial, the entire effective cooling process takes place during said reduced pressure treatment, and applying the reduced pressure at a plurality of rates, the pressure/time curve of the atmosphere in which the article is contained being thus modulated from a simple hyperbolic form, so that on the one hand, the article is not disintegrated, and on the other hand, the article is cooled very rapidly and does not suffer an unacceptable peripheral moisture loss. It will be noted that this method differs from previous attempts to obtain cooling by a reduced pressure treatment in that (i) the reduced pressure treatment is commenced as soon as possible after the article has left the oven, and without any deliberate pre-cooling period, and (ii) the reduced pressure is applied at a plurality of rates.

The change or changes in the rate of application of the reduced pressure is preferably effected in response to at least one of the following variables:

the temperature of the articles;
the temperature of the atmosphere in which the article is contained;
the pressure of the atmosphere in which the article is contained;
the amount of moisture in the atmosphere in which the article is contained;
the amount of moisture remaining in the article;

the degree of saturation of the atmosphere in which the article is contained, and the time of application of the reduced pressure.

It is also preferred that the transfer of the article from the oven to the reduced pressure treating chamber shall be effected so that the reduced pressure treatment commences at a temperature in the article corresponding to a saturated water vapour pressure in excess of 150 TORR (approximately 60° C.).

According to another aspect of the invention a method of rapidly cooling a freshly baked moisture-containing farinaceous foodstuff article comprises the steps of promptly submitting the article at its baked temperature without deliberate pre-cooling to a reduced pressure treatment, so that substantially the entire effective cooling process takes place during said reduced pressure treatment, and controlling the application of the reduced pressure by predetermined a pressure/time curve of the atmosphere in which the article is contained, said curve being modulated from a simple hyperbolic form so that, on the one hand the article is not disintegrated, and on the other hand, the article is cooled very rapidly and does not suffer an unacceptable peripheral moisture loss, and controlling such application of reduced pressure to conform to said predetermined pressure/time curve. In operating this method it is also preferred to control the application of reduced pressure to ensure that said pressure/time curve corresponds to said predetermined curve in response to at least one of the following variables:

the temperature of the articles;

the temperature of the atmosphere in which the article is contained;

the pressure of the atmosphere in which the article is contained;

the amount of moisture in the atmosphere in which the article is contained;

the amount of moisture remaining in the article;

the degree of saturation of the atmosphere in which the article is contained, and the time of application of the reduced pressure.

Crust is produced on bread and like farinaceous products by the creation of a moisture-starved boundary layer on the article. Now in the cooling of an article by the process of the invention, there is a tendency for the creation of a "free" moisture content differential from the outer surface of the article to the centre. (This is due to the impedance effect of the cell structure). If, as a result of this, a relatively thick zone of the article is virtually devoid of free moisture, the result will be the production of a correspondingly thick and relatively hard crust.

In other instances, of course, a crust is formed but it is desirable to keep the crust as thin as possible, and this is true of bread which is automatically sliced before being wrapped. Where it is necessary to avoid the production of a thick crust, the application of the reduced pressure must be controlled in stepwise fashion so as to avoid the creation of an excessive moisture denuded boundary layer.

In general, it can be said that the control should aim at maintaining a moisture saturated atmosphere around the article. One way of achieving this is to ensure that there is always some condensed and visible moisture in the atmosphere. The control can be exercised in a variety of ways:

In one possible control method, the rate of pressure reduction is regulated to give the desired moisture release from the article. Thus, although the vacuum is not completely broken, it may be in steps so that the pressure/time curve is modulated from the hyperbolic form it would naturally assume if the vacuum were increasing at a constant rate.

In a variation of the control method, the vacuum is reduced (i.e. pressure is allowed to rise) during the treatment. This may be a complete break in the vacuum, so that normal atmospheric pressure is allowed to reinstate itself around the article, and the duration of this break in the vacuum can be regulated according to the properties of the article (more especially its "free" moisture content, and its inherent impedence to moisture migration). In a refinement of this control method, the vacuum is broken on two or more occasions during the treatment, so that in effect, there is a pulsating pressure in the atmosphere to which the article is subjected.

According to another preferred feature of the invention, after the application of an initial reduced pressure, a gas is introduced into the article, pressure is allowed to rise and then the reduced pressure is re-applied. In this manner the gas which is introduced into the article is used as a carrier for heat, which is thereby removed from the article. In other words, the gas performs the function of transferring heat from the article by convection (as herein defined). The gas should preferably have a low density, but at the same time some gases may be difficult to use owing to the danger of creating an explosive mixture. A light inert gas such as helium may be suitable, but if a gas is used, for economic reasons, it will be preferable to provide for re-cycling of the gas.

According to another referred feature of the invention, the temperature of the atmosphere in which the article is contained is controlled, so as to control the pressure, and in consequence the moisture extraction rate.

In almost all practical applications of the invention it can be assumed that the controlled atmosphere will behave in accordance with the Ideal Gas Law $PV/T=C$: wherein P is the absolute pressure, V is the volume and T is the absolute temperature. Thus by controlling the temperature, which is relatively easy, the pressure is also controlled as required. In certain instances a combination of control is used where both temperature and pressure are adjustable (e.g. in the case of certain products containing a mixture of condensable and non-condensable gases) within the temperature range of the cooling device.

According to yet another preferred feature of the invention fluid is applied to the article in combination with the reduced pressure treatment.

According to yet another aspect of the invention, a method of producing a completely baked moisture-containing farinaceous foodstuff article comprises the steps of; baking the article to a predetermined internal temperature, terminating heating of the article substantially prior to the known, normal, complete baking time for said article; submitting the article to a reduced pressure treatment, and applying the reduced pressure at a plurality of rates, the pressure/time curve of the atmosphere in which the article is contained being thus modulated from a simple hyperbolic form so that on the one hand the article is not disintegrated, and on the other hand the article is cooled very rapidly and does not suffer an unacceptable peripheral moisture loss.

Preferably changing the rate of application of reduced pressure is effected in response to at least one of the following variables:

the temperature of the articles;
the temperature of the atmosphere in which the article is contained;
the pressure of the atmosphere in which the article is contained;
the amount of moisture in the atmosphere in which the article is contained;
the amount of moisture remaining in the article;
the degree of saturation of the atmosphere in which the article is contained, and
the time of application of the reduced pressure.

According to a further aspect of this inventon, a method of producing a completely baked moisture-containing farinaceous article comprises the steps of: baking the article by heating to a predetermined internal temperature, terminating heating of the article substantially prior to the known, normal, complete baking time for said article; submitting the article to a reduced pressure treatment; and controlling the application of the reduced pressure by predetermining a pressure/time curve of the atmosphere in which the article is contained, said curve being modulated from a simple hyperbolic form so that on the one hand the article is not disintegrated, and on the other hand the article is cooled very rapidly and does not suffer an unacceptable peripheral moisture loss, and controlling such application of reduced pressure to conform to said predetermined pressure/time curve.

When a moisture containing farinaceous foodstuff article (such as bread, for example) is placed in an oven and heated, the internal temperature of the article rises and eventually arrives at a maximum approximating to the boiling point of water (for present purposes it is possible to ignore boiling point elevation) at which temperature/time curve for the article becomes a plateau. When the internal temperature is at the "plateua" level then it can be said broadly that the temperature is sufficient for the thermal requirements of the physical chemistry of the baking process. Generally speaking it can be stated that the remainder of the baking time is required for a drying and stabilisation of the structure of the article - and indeed it can be readily observed that if a baked product is removed from the oven before stabilisation is complete, that the product physically collapses and this is associated with an under-developed - not properly baked product. The later part of the baking cycle, after attainment of the "plateau" temperature includes part of the gas expansion, starch gelatinisation and gluten coagulation about which many articles have been written.

It follows from this that for any given moisture-containing farinaceous foodstuff article, knowing its composition, there is a known, normal complete baking time, and that an unsatisfactory and incompletely baking article will be produced if the time is reduced. However, as set forth above, if the article is taken straight from the oven without deliberate pre-cooling and subjected to cooling by reduced pressure treatment in accordance with the cooling aspect of this invention, then a satisfactory product is produced even though the heating time is substantially reduced.

Hence in its broadest terms this method of producing a completely baked moisture-containing farinaceous article comprises the steps of: baking the article by heating to a predetermined internal temperature, terminating heating of the article substantially prior to the known, normal complete baking time for said article, and submitting the article to a reduced pressure treatment.

The reduction in heating time may be up to 25% of the normal heating time.

Other preferred features of the invention will appear from the following description of specific embodiments.

SPECIFIC EMBODIMENTS

Certain specific constructions of apparatus and their method of use in accordance with the invention, will now be described by way of example only, with reference to the accompanying drawings, in which:

FIG. 1 is a perspective view of a batch cooler,

FIG. 2 is a front view of the batch cooler,

Figure 10:
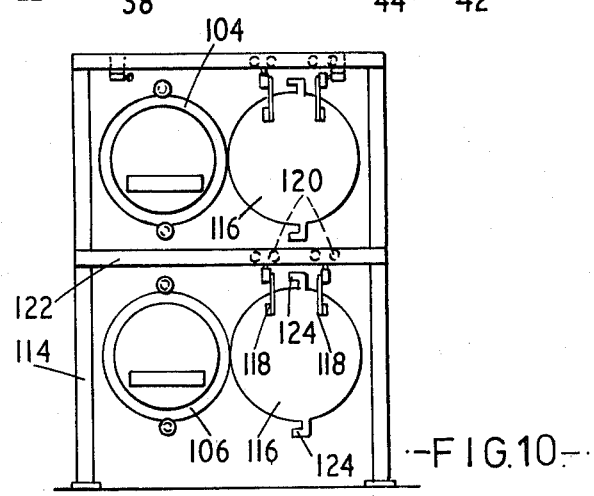
Figure 16A:
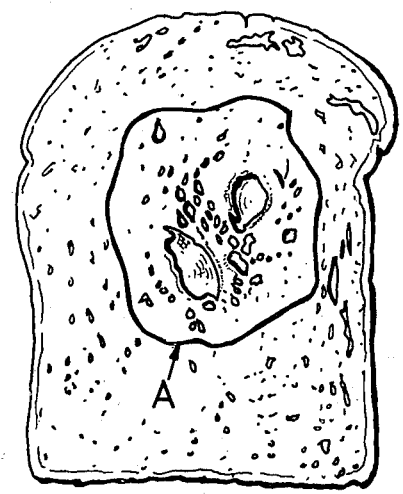
Figure 16B:
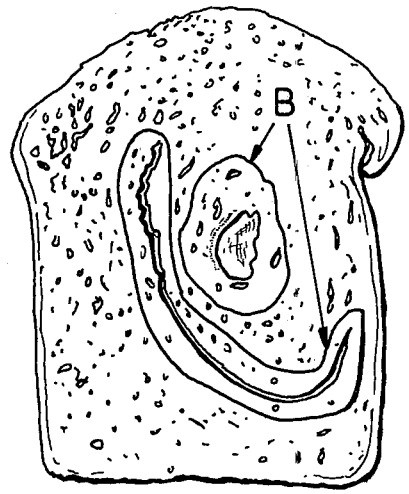
Figure 16C:
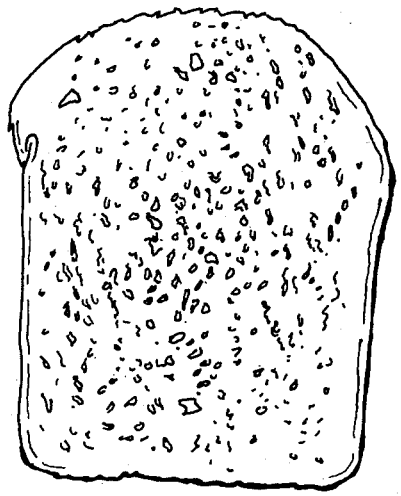
Figure 17:
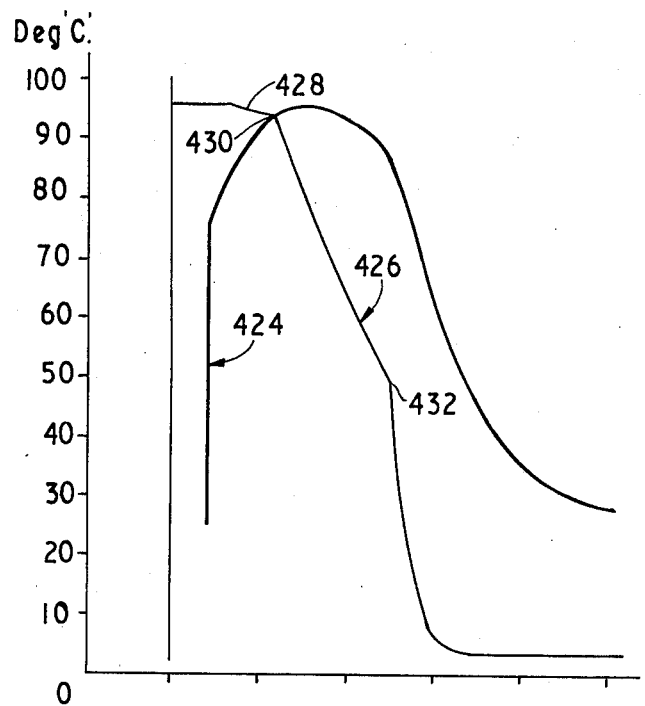
Figure 18:
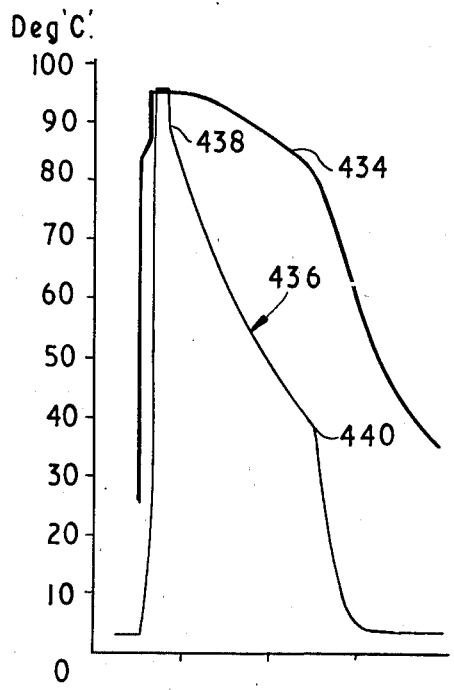

FIG. 4 is a diagram illustrating one method controlling the application of a vacuum, FIG. 5 is a diagram illustrating a second method of controlling the application of a vacuum, FIG. 6 is a diagram illustrating a third method of controlling the application of a vacuum, FIG. 7 is a graph to illustrate the application of vacuum to the cooling apparatus, FIG. 8 is a perspective view of a "continuous" cooler, FIG. 9 is a side view of part of the cooler shown in FIG. 8, with the cover removed FIG. 10 is a front view looking from left to right in FIG. 9 but with certain parts omitted to show a door arrangement more clearly, FIG. 11 is a side view of vacuum apparatus for use with either the batch cooler shown in FIG. 1, or the continuous cooler shown in FIG. 8, FIG. 12 is a diagram illustrating one method of sensing temperature, moisture and pressure conditions, FIG. 13 is a temperature/time diagram showing a complete cooking and cooling cycle for bread, FIG. 14 is a diagrammatic representation of a test rig, FIG. 15 is a characteristic graph of the operating conditions in the testing, FIG. 16a to 16f are a series of view taken from actual photographs showing the cross-section through a loaf at various stages in an experimental process, FIG. 17 is a pressure and temperature/time graph of a cooling process used to cool a single loaf in a test, FIG. 18 is a graph similar to FIG. 17, but showing modified curves when three loaves are cooled together, FIG. 19 is a view taken from an actual photograph showing the cross-section through two maderia cakes for the purpose of comparing the result of using the process of the invention with the conventional process.

FIG. 20 is a graph similar to FIG. 17, but showing the curves relating to the maderia cake shown in FIG. 19, FIG. 21 is a view taken from an actual photograph similar to FIG. 19, but showing two malt loaves, FIG. 22 is a view taken from an actual photograph similar to FIG. 19, but showing two meat pies, FIG. 23 is a view taken from an actual photograph similar to FIG. 19, but showing two sausage rolls, and FIG. 24 is a view taken from an actual photograph similar to FIG. 19, but showing two Vienna Rolls.

DESCRIPTION OF THE PREFERRED EMBODIMENTS

Generally it is thought that the invention will find one of its major applications in bakeries for the cooling of the baked break, since, as will become apparent, the apparatus is much more compact than the conventional bakery cooler, and the process is very much more rapid than that which is carried out in the conventional bakery cooler. It is to be understood however, that the process can be used to cool other moisture-containing farinaceous foodstuff articles such as, for example, meat-pie, crusts and cakes.

Figure 3:
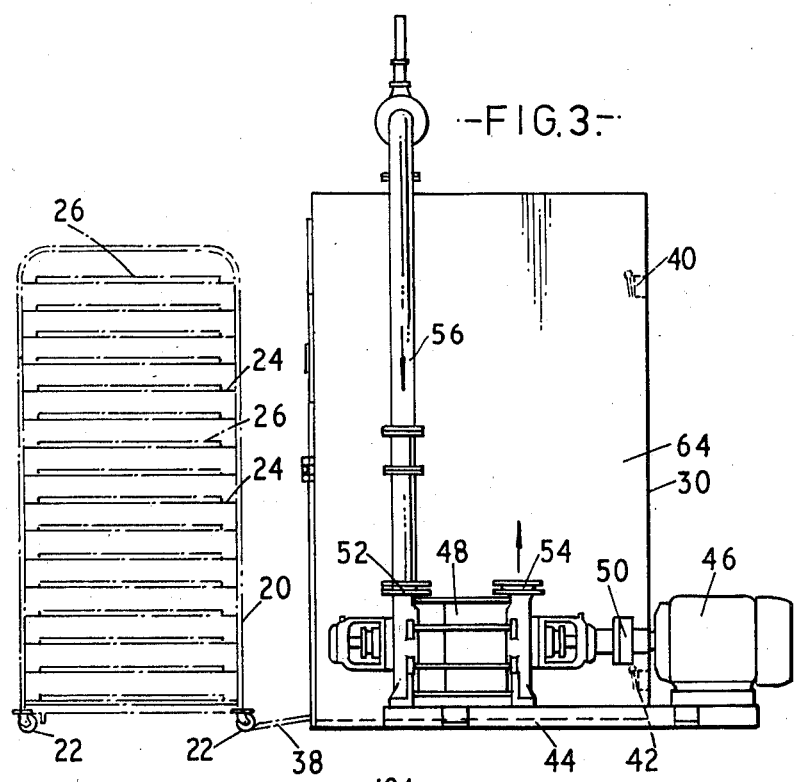
FIG. 3 is an end view looking from right to left in FIG. 2.

Referring to FIGS. 1 to 3 of the drawings, there is shown a batch cooler which can be used in a bakery, wherein the articles to be cooled are baked in batches rather than in a continuous process.

For transporting baked articles from the oven or other previous apparatus to the cooler, there is provided a portable rack 20, which is constructed as a tubular steel framework supported on castor type wheels 22 for easy manipulation, and provided with a series of shelves 24 on which baked articles can be supported. In FIG. 3, a number of baking sheets 26 are illustrated on the shelves 24, and these would be suitable for carrying baked items such as cakes. It is to be understood however that any type of baked article could be placed on the portable rack 20 and in the case of the loaf tins, it might be necessary to have the shelves 24 spaced more widely apart vertically, so as to accommodate the loaf tins.

The cooler itself basically consists of a vacuum or cooling chamber 30, which is made as a steel fabrication in the form of a cabinet closed on all its sides except the front, where there is a large hinged door 32 provided with a handle, a catch device 34 and an inspection window 36. The door 32 is adapted to make a substantially airtight seal with the casing of the chamber 30, and for this purpose, the door may be provided with a resilient and deformable sealing member (not shown) around its periphery, this sealing member being compressed when the door is in the latch position to effect the seal.

It will be observed that the chamber 30 is of such a size, that the rack 20 can be accommodated within it and the door 32 is large enough to allow the entrance of the portable rack 20 through the front of the chamber 30. There is also a retractable track 38 provided on the cooler, for facilitating the entry of the portable rack 20 into the chamber 30. The track 38 is pivoted so that it can be swung from the operative, extended position shown in FIG. 3, into a completely retracted position inside the chamber 30, and rack-and-pinion device (not shown) actuated by a pneumatic cylinder, is provided for controlling the movement of the retractable track 38. When the track 38 is in the operative position shown in FIG. 3, it provides a ramp, up which the rack 20 can travel into the chamber 30. Alternatively, a scissors linkage elevator may be provided as shown in FIG. 1.

Two limit switches 40 and 42 are mounted on the inside of the rear wall of the chamber 30, and these are arranged so that they are engaged by the rack 20, when the latter is properly positioned within the chamber 30. The switches 40 and 42 are used to ensure that the cooler is not operated until the rack 20 has been placed in the correct position. There may also be a further limit switch (not shown) adapted to be closed when the door 32 is in the fully closed and latched position, for ensuring that the cooler cannot be operated, until the door 32 has sealed the open front of the chamber 30 after the loaded rack 20 had entered the chamber.

A bed plate 44 is mounted alongside the chamber 30, and this supports an electric motor 48, which drives a pump 48 through a flexible coupling 50. The pump 48 is a liquid ring vacuum pump, that is to say it is a pump normally operated at high speeds, for the purpose of pumping air or other gases. In addition, this particular pump is provided with an air ejector of known type, which is adapted to increase the efficiency of the pump. The pump inlet is indicated at 52 and the outlet at 54.

It is to be understood, that whilst a liquid ring vacuum pump with air ejector has been described above, any other pump which is capable of pumping gases could be used, and in particular, the batch cooler may be fitted with a pump arrangement, as described hereinafter with reference to FIG. 11 of the drawings.

A vacuum pipe 56 leads from an outlet 58, to the pump inlet 52 there being an air admittance valve 60 and an isolation valve 62 connected in the pipe. Both the valves 60 and 62 are solenoid operated valves, so that they can be controlled automatically. When the air admittance valve 60 is closed and the isolation valve 62 is open, it is possible to extract air and vapour from the interior of the chamber 30, by operation of the pump 48. Alongside the chamber 30, there is a casing 64, housing control gear (not shown), which control gear is used to control the operation of the electric motor 46, and the valves 60 and 62. A control panel 66 is provided on the front wall of the casing 64.

In FIG. 2, there is indicated in chain dotted lines a possible position for a second cooling chamber, similar to the chamber 30, and this further chamber could be connected to the same vacuum pump 48, so that the two cooling chambers are operated by the same pump.

It wil be appreciated, that the apparatus so far described with reference to FIGS. 1 to 3, enables baked articles placed in the cooling chamber 30, to be subjected to a reduced ambient pressure, by operation of the pump 48, to extract air and vapour from the interior of the chamber. It has been found however, that if this type of apparatus is operated in an uncontrolled manner (i.e. by simply allowing the degree of vacuum to increase at a constant rate) in order to cool the baked article by removing vapour therefrom, there are attendant disadvantages, which render the process incapable of use on an economic scale in a bakery. For example, moisture could be given off from the article so rapidly, as to cause an explosion of the article, disintegrating it physically, and rendering it unsaleable. On the other hand, if the removal of moisture is at too slow a rate, this can produce moisture denuded areas, resulting in an undesirably hard thick crust. Again, it is not usually desirable to remove too great a quantity of moisture from the article, as this can result in the production of an underweight article.

For these reasons, it has been found necessary to modulate the application of the vacuum to ensure that a useful article is achieved. One method of modulating the process, is by varying the operation of the vacuum pump 48, so that instead of a continuous reduction of the pressure within the chamber 30, the reduction is at a plurality of rates, whereby pressure within the chamber fluctuates to produce the desired effect.

In a test, a 10 ounces Vienna cob was cooled in apparatus of the type shown in FIGS. 1 to 3. The loaf was taken directly from the oven in which it had been baked, into the cooling chamber, with a minimum of exposure to atmosphere. On entry into the cooling chamber 30, the loaf had a temperature of approximately 100° C. at the core.

The inlet valve 60 was closed, the isolating valve 60 opened and the vacuum pump 48 was operated, to extract air and water vapour from the chamber 30. The pressure within the chamber, as recorded on a pressure gauge 68 and the temperature of the loaf as recorded by a probe, were carefully noted. When the loaf temperature reached approximately 90° C. (corresponding to a pressure of about 500 TORR) the valve 60 was opened allowing air to flow into the chamber 30, and alter the degree of vacuum.

The pressure rose to near atmospheric pressure (about 760 TORR) and then the valve 60 was closed to allow the vacuum to be re-applied. This process of breaking the vacuum was repeated when the temperature dropped to about 30° C. corresponding to a pressure of about 31 TORR. The resultant pressure/time graph is shown in FIG. 7, and it will be observed that the reduction in pressure is effected at a plurality of rates.

Each time the vacuum was broken, there was condensation of some of the vapours in the article and in the chamber to ensure physical stability of the loaf. As a result of this process, the loaf was cooled to about 28° C. before removing from the chamber, which would be a satisfactory temperature at which to remove a loaf from a conventional cooler. By visual observation, the bread was equivalent to that cooled by conventional methods. It will be understood however, that the total process takes only a short time measured in seconds or minutes, as compared with the several hours normally required for cooling in a bakery.

Although a specific instance of cooling a loaf has been described above, it will readily be appreciated by those skilled in the art, that a batch of similar loaves, could be cooled in the chamber 30.

In the process just described, the solenoid valves are actuated to control the applicaton of the reduced pressure treatment in response to the temperature of the article (i.e. the loaf) as detected by a probe 302 (FIG. 12) sensing the temperature of the loaf. It will be appreciated how the control gear is programmed to carry out the sequence of pressure variation in response to the sensed temperatures.

There are, of course, other ways of initiating operation of the control functions. For example, a vacuum pressure switch 304 (FIG. 12) could be provided to sense the pressure of the atmosphere in the chamber 30, or a thermocouple, thermistor, thermostat or a thermally responsive probe 306 could be fitted in the chamber to detect the temperature of the atmosphere in the chamber; or a PIRANI type gauge 308 could be fitted to detect the amount of moisture in the atmosphere in the chamber, or the degree of saturation of that atmosphere; or a transducer 310 could be provided to detect the amount of moisture remaining in the loaf.

In all the examples of sensing devices quoted above, it is some physical characteristic of the article or the atmosphere in the chamer which is being sensed. However, it is possible in some instances to control the application of the reduced pressure treatment in response to time. For instance, if a pie mixture is to be cooled, it is possible, by experiment, to determine the maximum first rate at which moisture can be removed from the freshly cooked pie mixture, without exploding the mixture, and to determine a time at which it is possible to increase the rate of reduction in pressure. If the cooler is required to deal consistently with the same type of pie mixture, then the pump can be set to apply the vacuum as rapidly as permissible, and the times set first to increase the rate of pumping and then to arrest the application of the vacuum before the mixture explodes.

Generally speaking, in the case of bread, it will be desirable to sense some property of the ambient atmosphere.

In many instances, it will be desirable to control the application of the reduced pressure by a stepped increase in the vacuum at a predetermined point in the process. Apparatus for doing this is shown in chain dotted lines in the upper part of FIG. 2. In addition to the pipe 56, there is a smaller bore pipe 200 connected in parallel with the pipe 56. Because of its smaller bore, this pipe 200 has a greater impedance than the pipe 56, and during a first part of the vacuum cycle, the pipe 200 is opened and the pipe 56 is closed. Consequently, the suction is applied at a low level, but when the pipe 56 is opened, the vacuum is applied at a faster rate. If increase in pressure is required during the period when the pipe 200 is being used, it will be necessary to provide a further solenoid operated air admittance valve such as the valve 60 in the pipe 200.

An alternative method of controlling the application of a vacuum is illustrated diagrammatically in FIG. 4.

In addition to the vacuum pump 48, there is provided a refrigeration unit 70 situated adjacent to the cooling chamber 30. A temperature control member illustrated diagrammatically at 72 in FIG. 4 is fitted within the chamber 30. Basically this control member 72 can be said to be an evaporator coil of the refrigerator 70, and it is similar in construction to evaporator coils which are sometimes used in refrigerators or deep freezers. In this construction, the temperature control member is shaped to fit closely inside the top and side walls of the chamber (so that it is of deep inverted channel cross-section) but when fitted in the chamber it is thermally insulated from the outer walls of that chamber by a layer of insulating material such as cork.

The control member 72 is made from two stainless steel plates welded together around their edges and along intermediate paths, the two plates being bulged apart to provide a continuous tortuous tube between the plates. There are inlet and outlet connections for this tube which is provided to contain a working refrigerant fluid such as a Freon (halogenated hydro-carbon).

The refrigerator unit itself comprises a power driven compressor 74, a condenser 76 and the necessary expansion valve and associated equipment. The compressor 74 and condenser 76 are connected by pipes 78, 80 and 82 in series with the evaporator coil constituted by the temperature control member 72. The condenser 76 has an electric motor driven cooling fan, but the refrigeration unit 70 is modified by the provision of a by-pass pipe 84 including a solenoid controlled by-pass valve 86 whereby, when the valve 86 is opened, the refrigerant can be made to by-pass the condenser 76, so that refrigerant fluid remains in its liquid phase and does not absorb heat.

The control gear (not shown) for the apparatus includes pressure and temperature gauges reading the conditions in the cooling chamber 30, and automatic control means, whereby the by-pass valve 86 can be operated in response to detected variations in the pressure and temperature within the chamber 30. In operation, when a set of baked loaves or other baked articles fresh from the oven has arrived in the chamber and the door 32 closed, the vacuum pump 48 is started to extract air from the chamber. The refrigeration unit 70 is also started when required. As the pressure falls within the chamber 30, the moisture in the loaves (water) begins to evaporate. When a predetermined low pressure is reached, the vacuum pump is disconnected from the chamber by closure of the isolation valve 62 and thereafter it should not be necessary to evacuate the chamber till the cooling cycle is completed and the next batch of loaves arrives in the chamber. The refrigerator 70 is also operated in the usual manner until the temperture control member 72 is at the requisite temperature level.

Water - or any other moisture in the loaves - is given off as a vapour due to the reduced pressure, and because of this the latent heat of the water is extracted from the loaves. This produces a very rapid cooling effect, which is characteristic of vacuum cooling techniques, but the water vapour tends to raise the temperature of the chamber itself. If this were allowed to happen without control, the cooling process would become protracted due to a reduction in the thermal transfer rate, and the re-evaporation of the condensate. However, the water vapour (or some of it) condenses on the temperature control member 72, and this reduces the temperature to one at which cooling can continue at the desired rate. The evaporator "coil" acts as a cryogenic pump for the condensible vapours, but it reduces the pressure at a different rate to the pump 48. It is possible to consider the loaf as consisting of a relatively soft core - which as the loaf leaves the oven is in a plastic state - and the peripheral boundary layer which produces the crust. Now during the evolution of vapour from the loaf, the moisture which escapes from the core has to overcome the impedance of the load before leaving the surface of the loaf. On the other hand, the moisture in the boundary layer has little or no impedance to overcome. In consequence if the reduction in pressure is allowed to continue unmodified, the surface moisture level will be lower than that of the core and at a particular part of the evacuation cycle the boundary layer will become moisture denuded to an unacceptable level. It has already been said that one way of attempting to overcome this problem is by varying the pressure in the chamber 30. However, the refrigeration apparatus shown in FIG. 4 provides a means of preventing excessive dehydration of the loaf which is some circumstances is easier to operate than the pressure control system, due to its action as a very efficient vapour pump.

At appropriate times in the cooling cycles, the condenser 76 of the refrigeration system is by-passed by opening the valve 86, so that the refrigerant in liquid phase flows through the temperature control device 72. This raises the temperature of the latter to such an extent that condensate is evaporated from the control device 72, and flows back to the loaves in the chamber, the isolation valve 62 being closed at this time to isolate the chamber from the pump 48.

It will be appreciated that by raising the temperature of the control device 72, the pressure in the chamber is also raised, and in this way the rate at which the fluid is given off by the loaves can be varied. It may be possible by automatic control of the temperature to control the pressure so that in practice there is no necessity for reverse flow of fluids to the loaves, the rate of escape of the fluids being closely controlled.

An alternative method of controlling the cooling process is illustrated diagrammatically in FIG. 5, wherein again, the cooling chamber is shown, but there are outlet nozzles 90 inside the chamber 30, these outlet nozzles being connected to a source of steam of $H_2O$ vapour (not shown). A solenoid control valve is also provided, for controlling the emission of steam from the nozzles 90 into the chamber 30 as required. The steam may, for example, be taken from a supply of dry steam at a known temperature and pressure and expanded through an orifice under controlled conditions to produce wet steam with fine particles in the order of less than a micron in size. Before the steam is admitted to the cooling chamber 30, the pressure in the latter is reduced (say to about 350 TORR) so that some residual gases (including some water vapour) escape from the loaves in the chamber.

The steam is then admitted, and water particles are carried into the loaves to replace and supplement the lost gases. The steam is applied so as to add a predetermined weight of water to the loaves. This can be determined by sensing the moisture content and/or temperature and pressure conditions within the chamber, and applying the steam for a measured time, or it can be determined from the moisture content of the loaf itself, providing that some weighing means or a transducer is incorporated in the chamber 30.

After application of the steam, the loaf can be submitted to vacuum and control pressure conditions in the manner previously described with reference to FIG. 7, simply by controlling the valves 60 and 62. During this part of the process the pressure within the chamber may be reduced to 20 TORR.

A combination of the control methods described with reference to FIGS. 4 and 5 may also be employed, and the apparatus required for this is illustrated diagrammatically in FIG. 6.

Again, the vacuum chamber 30 is provided with a temperature control member 72 which forms the evaporator coil of the refrigeration unit 70. In this arrangement however, the steam injector nozzles 90 are also fitted within the vacuum chamber.

Before the steam is admitted to the cooling chamber, the pressure of the latter is reduced as described above to about 350 TORR and then the steam is admitted so that the water particles are carried into the loaves to replace and supplement the lost gases. When the predetermined moisture content and/or temperature and pressure conditions within the chamber are sensed, the supply of steam is cut off, and the vacuum pump 48 is operated. Thereafter, the control of the cooling cycle is carried out as described with reference to FIG. 4 of the drawings. It should be understood, that the temperature rise permitted in the chamber 30 when the condenser 76 is by-passed, is controlled in such a manner that the evaporated gases condense to give free water droplets of a predetermined size, which are entrained in the gase steam. These small particles (often sub-micron) will pass through the porous surface structure of the baked product, and introduce moisture in the wet phase to the product.

Turning now to the apparatus which is illustrated in FIGS. 8 to 10 of the drawings, it should be explained that this apparatus is intended to deal with the output from a continuous oven in a bakery, wherein the loaf tins are fed to the apparatus on a feed conveyor 100. The loaves pass directly from the oven (not shown) to the cooling apparatus, and it is not intended that there should be any intermediate cooling step between the oven and the cooling apparatus. Any cooling which does occur whilst the loaves are travelling on the feed conveyor 100 is incidental, and minimal, and in practice, the conveyor 100 will be kept as short as possible.

Between the output end of the feed conveyor 100 and the cooling apparatus itself, there is a pivoting conveyor 102 of a known type. This conveyor can be moved from the upward position which is illustrated in full lines, to a lower position illustrated in chain dotted lines. When it is in the upper position, it is adapted to feed loaves to an upper chamber 104, and when it is in the lower position, it is adapted to feed the loaf tins or articles removed from tins to a lower cooling chamber 106. The chambers 104 and 106 are generally cylindrical in shape, and extend horizontally, there being a conveyor 108 provided in the lower part of each of these chambers for the purpose of traversing the loaf tins through the chambers. Sheet steel covers 111 enclose the chambers 104 and 106.

At the output end of the cooling chambers, there is a second pivoting conveyor 110, referred to as the take away conveyor, and this is adapted to be moved from the upper position illustrated in full lines, where it is able to receive the loaves or loaf tins issuing from the top chamber 104 to the lower position illustrated in chain dotted lines, where it is able to receive the loaf tins issuing from the lower chamber 106. The take away conveyor 110 is arranged to deliver the loaves or loaf tins on to a conveyor 112, which carries the tins away from the cooling apparatus, to a subsequent process.

The cooling chambers 104 and 106 are supported by a framework 114 which is illustrated in FIG. 10, and as the chambers are identical in construction, it is only necessary to describe one in detail.

At each end of each chamber, there is a door 116. The door 116 is suspended by a pair of brackets 118 from two small wheeled trollies 120 which run in an inverted channel type rack 122, forming part of the framework 114. By virtue of this method of mounting the door 116, the door can be moved from a position where it closes the open end of the chamber 104 or 106, to a position illustrated in FIG. 10, in which it lies alongside the open end of the chamber. A pneumatically operated ram-and-cylinder device (not shown) is provided for moving the door 116 laterally from the open to the closed position and vice versa.

The door 116 also has upper and lower L-shaped lugs 124 by means of which can be pulled into sealing engagement with the end of its chamber. It will be observed that the open side of the notch formed between the front of the L-shaped lug 124 and the main disc portion of the door itself faces the chamber 104 or 106. At the end of the chamber, there are outwardly projecting fixed lugs 126, one above and one below the chamber, and a pneumatic cylinder 128 is fixed on the inside of each of these lugs. The ram 130 on the cylinder 128 is formed with a mushroom head 132, and the arrangement is such that when the ram 130 is in the extended position which is illustrated in FIG. 9, then the part of the ram between the lug 126 and the mushroom head 132, can engage in the notch between the foot of the corresponding L-shaped lug 124 and the disc portion of the door, when the latter is traversed along the track 122, into the closed position. Thereafter, when the cylinders 128 are activated to retract their respective rams 130, the mushroom heads 132 engaging on the outer faces of the lugs 124, pull the door towards the end of the chamber 104 or 106. A sealing ring made of resilient and deformable material is fixed to the inside face of each door 116, so that when the cylinders 128 are activated to pull the door on to the end of the chamber, a substantially airtight seal is formed between the door and the chamber.

The arrangement of the door just described, provides a convenient way of opening and closing the chambers 104 and 106, and moreover renders the operation of the door susceptible of automatic control, since it is only necessary to activate the ram-and-cylinder device which is not shown, for traversing the door, and then to activate the ram-and-cylinder devices 128 and 130.

During operation of the apparatus, supposing that loaf tins are travelling on the conveyor 100, and thence on to the conveyor 102 which is in the upper position, then the doors 116 at each end of the upper cooling chamber 104 will be open. Furthermore, at that time, the conveyor 108 will be operated, so that the loaf tins will pass into the chamber 104 through the open front end, and thence along the conveyor 108. A limit switch (not shown) may be provided within the chamber 104 near to its output end, so that as the first loaf or loaf tin to arrive in that chamber, arrives near to the output end, the limit switch is operated to stop the conveyor 108. In this position, the chamber 104 will be full of loaf tins, lying on the top run of the conveyor 108. When the signal is given that the chamber 104 is full, the conveyor 102 is moved from its upper to its lower position, and at the same time, the doors 116 on the lower chamber are opened to allow the loaf or loaf tins to begin to pass into that chamber. The conveyor 108 in the lower chamber 106 is actuated to deliver any tins in that chamber out on to the take away conveyor 110, which is then in the lowered position, and a signal is given to the operating mechanism for the doors 116 on the upper chamber 104 so that those doors begin to move into the closed position. The operating cycle is timed so that the cooling process in one chamber can take place during the time required to fill the other chamber, so that each time a change over is made by the pivoting conveyor 102, one of the chambers beings to discharge its load of cooled loaves and to receive a new load of loaves from the oven. In this manner the two chambers 104 and 106 of the cooling apparatus are able to deal with the output of the continuous oven. If more than two chambers are required, it is possible to add a third chamber, above the chamber 104, part of such a chamber being indicated in chain dotted lines in FIG. 9.

Referring now to FIG. 11, there is illustrated a vacuum pumping arrangement which is used with the apparatus shown in FIGS. 8 to 10, but which can also be used with the batch cooler shown in FIGS. 1 to 3. A base plate 134 is mounted adjacent to the cooling chamber, and an electric motor 136 mounted on this base plate drives a vacuum pump 138. The pump is part of a steam augmented vacuum unit of a known type which includes a venturi 154 and a spray-type condenser 156. The chambers 104 and 106 are respectively provided with outlets 140 and 142 from which suction pipes 144 and 146 lead via air admittance valves 150, to a common suction pipe 152. The latter leads into one side of the venturi 154 which in turn leads into the vertical condenser 156. Steam under pressure is supplied through the end 158 of the venturi 154 and as the steam flows through the venturi, the resultant reduction in pressure helps to suck air through the suction pipes 152, 144 and 146. The condenser is maintained at a low temperature by evacuation through a pipe 159 and the pump 138. Consequently steam entering the condenser condenses in the water spray and the resultant reduction in pressure applies vacuum to the pipe 152. This suction is used to apply vacuum to the cooling chambers 104 and 106, and the vacuum is controlled by the air admittance valves 148 and the isolation valves 150. The actual control of the cooling process, can be carried out merely by controlling the vacuum, which involves breaking the vacuum as previously described, or in any of the ways described above with reference to FIGS. 4, 5 and 6 of the drawings, since the apparatus disclosed in FIGS. 4, 5 and 6, can of course be combined with that shown in FIGS. 8 to 10.

The primary object of the cooling methods described above, is to reduce the time taken for the cooling process itself, and incidentally to reduce the size and cost of the cooling apparatus. However it has been found that there are certain concomitant advantages arising out of the use of the apparatus and method.

Referring to FIG. 13, there is shown in diagrammatic form a typical conventional temperature/time curve for a complete baking process, it being understood, that this is purely a diagram and that the slopes of the curve will vary with the article being baked. When the article is in the oven, the temperature rises (curve X) up to a maximum, which will be the boiling point of the liquids in the article (approximately 100° C.). This temperature is maintained until the article is completely baked, at which time, it is removed from the oven. The temperature of the article then begins to fall, following the curve Y until the point Z at which the temperature is low enough to allow the article to leave the cooling zone for the next process (e.g. slicing or wrapping). The cooling process may take two to three hours.

Now it has been ascertained, that the later part of the baking time merely has the effect of stabilising the article, and is not required to actually bake the article. For any given product, however knowing the ingredients and the type of product, there is a known minimum baking time, and if the article is removed from the oven any substantial period before that minimum time, and then allowed to cool in atmosphere, the article suffers physical collapse, and will generally be unsaleable.

However, it has been discovered that if the baked article is taken directly from the oven into the vacuum cooler, so that there is no appreciable cooling in atmosphere, it is possible to avoid the physical collapse of the article, even though it is removed from the oven a substantial time before the normal complete baking time. For example, if the article is removed from the oven at the point T, and its temperature rapidly reduced in a vacuum cooler as described previously, the temperature follows the curve t and falls very rapidly to the required low temperature (normally achieved at the point Z) without physical damage to the product.

Taking the example of the production of hard rolls which require a normal baking period of 24 minutes, it is found that the product is actually baked during approximately 80% of this time, the last 20% is one of stabilising and drying out the product. By utilising the present invention, it is possible to remove the rolls from the oven after approximately 80% of the normal baking time, place them in the vacuum cooler, and by the control of the cooling apparatus previously described, produce a completely baked product having the requird characteristics. In other words, the vacuum cooling process with the control which has been described above, can be used to cut down the actual baking time by eliminating the part of the baking time which is attributable merely to stabilising and drying out the product.

In some instances the baking time can be reduced to 70% of normal, but in most cases the reduction in baking time is between 15% and 25%. Since the cooling process is very rapid, it follows that the complete baking and cooling process can sometimes be carried out within the time normally required for baking—as indicated by the position of the curve t in FIG. 13.

Whilst it is preferred to use the controlled rate vacuum process in association with a shortened cooking time, it is to be understood that with some articles, it will be possible to achieve satisfactory results if the baking time is substantial reduced followed immediately by vacuum cooling wherein the vacuum is applied without control (i.e. with the simple hyperbolic pressure/time curve).

Another advantage arising out of the use of the invention is that of being able to exercise a close control over the formation of crust. In the case of hard rolls, it is of prime importance that the crust should be crip, and that this crispness should be self-sustaining for as long as possible. By presenting the rolls to the cooling chamber in hot form straight from the oven supplemented by higher than normal moisture content due to the fact that the roll has been removed before the usual final drying out in the oven, it is found possible to physically increase the size of the product by the application of vacuum. The control of the atmospheric extraction rate by the vacuum pump, affects the crust character as a function of the surface, or near surface moisture extraction related to the extraction rate of moisture from the core of the article. This relation is a function of the impedence factors due to the cell structure of the article.

On entering the vacuum chamber, the article is in a plastic state, and because of the internal pressure generated by the escaping gases, an expansion effect is achieved. Since at the same time the temperature is being reduced it is now possible firstly to expand the article, and then to stabilise the profile, as part of the formation of the crust. This in turn draws the cellular structure of the article onto an open form, which is maintained for a considerable period of time.

Another instance, in which the vacuum cooling treatment improves the appearance of the article is that of malt bread. This is physically very sensitive when in a hot state, and previous known methods of cooling have shown a tendency to cause collapse of the loaf, and general profile distortion. By using the vacuum cooling method, it is possible to cool the loaf in the tin, and the cause its profile to follow the inner contour of the tin. This means, that the volume of the article expands to give a product easily wrapped, less prone to damage, and with a relatively low water loss.

Further, by removing the article from the even before the completion of the conventional baking cycle time, it is ensured that the moisture content is higher than would usually be the case. The careful control of the moisture extraction rate, and the final temperature with or without the reintroduction of moisture as described in the specific embodiments above, allows the production of crust characteristics of various types. Moreover it has been found that the moisture distribution through the article is much more even than with a conventionally cooked product.

If it is desired to add armomatic flavours to the loaves, then it is essential to control the processes so that at some stage the reverse flow of gases occurs. The aromatic (e.g. an essential oil) is simply placed in the chamber in an open topped container. Some of the aromatic liquid is evaporated and the aromatic vapour will be carried into the loaves by condensation.

SPECIFIC EXAMPLES OF PROCESS

Some indication of the possible applications of the invention in all its aspects can be obtained from the following specific examples of the baking and cooling processes. In all these examples, the products were baked in a conventional bakery oven, and the baking itself was entirely conventional excepting that in some instances, the baking time was deliberately forshortened as will be described.

Two kinds of cooling were employed in these experiments. Firstly, some of the products were cooled in atmosphere for comparative purposes. In all cases, this conventional cooling takes a long time - never less than one hour. Secondly, some of the products were cooled in a test rig to provide the controlled vacuum cooling which is characteristic of the present invention. As illustrated in FIG. 14, the test rig comprises a vacuum chamber 400, and a vacuum pump 402 connected to the vacuum chamber by three tubes 404, 406 and 408. The tube 404 has a bore of 1 inch diameter and is referred to as the full bore tube. The tube 406 has a bore of ½ inch diameter, but is also formed into a helical coil 410 so that its impedance to gas flow is increased, and this tube is referred to as the medium bore tube, and the tube 408 has a bore of ¼ inch diameter and is formed into a coil 412, this being referred to as the small bore tube. There are also control valves for selectively opening and closing the tubes 404, 406 and 408.

In operation, the pump 402 is operated and only the small bore tube 408 is opened. This allows evacuation of the vacuum chamber at a slow rate. Eventually, the medium bore tube 406 is also opened (leaving the small bore tube 408 open) so that evacuation proceeds at a faster (medium) rate. Finally, the large bore tube 404 is opened - so that all three tubes are then open - and the evacuation then proceeds at a fast rate.

Referring to FIG. 15, wherein the pressure in the vacuum chamber 400 is plotted against time, it is to be understood that this Figure is purely diagrammatic since the conditions will vary according to the product and the test. However the upper part of the curve shows the slow reduction in pressure at the slow rate of pumping until at point 420 medium rate pumping commences, and the curve becomes steeper. At the point 422 fast rate pumping is initiated, and the curve becomes even steeper.

EXAMPLE I

This example describes a test to ascertain if the baking time for ordinary bread could be reduced. The dough for the bread was made up of the following ingredients:

| | |
|---|---|
| Flour | 140 lb. 0 oz. |
| Salt | 3 lb. 4 oz. |
| Yeast | 3 lb. 4 oz. |
| Improver | 1 lb. 10 oz. |
| Fat | 1 lb. 0 oz. |
| Water | 88 lb. 0 oz. |

After the usual preparatory processes, this mixture was divided into two pound loaf tins and baked in the oven at a temperature of 213° C. Now with this mixture and oven temperature it is known that the loaves must stay in the oven for 26 minutes to produce a properly baked product. However, for the purpose of this test, at various stages, as will be described, a loaf was removed from the oven, and taken immediately, and without intermediate cooling into the vacuum chamber 400 and cooled, by submitting it to a modulated vacuum cooling. FIG. 17 shows the cooling process, and in that Figure, the line 424 shows the core temperature of the loaf as measured by a thermocouple probe inserted in the loaf, and the line 426 shows the absolute pressure in the vacuum chamber. The core temperature is measured in degrees Centigrade and the pressure is shown as a percentage of atmospheric pressure (i.e. 100%=760 TORR).

The apparent rise in the temperature of the loaf core as shown by the left hand part of the line 424 should be ignored. This simply represents the time taken for the thermocouple to detect the full temperature, and it will be apparent therefore that the starting core temperature is just below 100° C. (A similar phenonenon is apparent in FIGS. 18 and 20 and can be discounted there also).

The shallow sloping part 428 of the pressure curve 426 shows the slow reduction of pressure which occurs when slow rate pumping, but at the point 430, medium rate pumping commences and at the point 432 fast rate pumping commences. There are thus three distinct pumping rates required to reduce the pressure in order to cool the product rapidly, but without exploding it. The whole cooling process took 3.5 minutes.

FIG. 18 is a graph showing the conditions when three loaves are cooled simultaneously in the vacuum chamber 400 in a time of 1 minute. The line 434 shows the temperature in the core of the loaves and the line 436 shows the pressure curve which again changes its slope at the two points 438 and 440 where the changes are made to medium and then fast rate pumping.

In FIGS. 16a and 16f there are shown cross-section views through loaves of typical United Kingdom bread, each removed from the oven after various baking times and then subjected to the vacuum cooling technique discussed.

Referring now to FIG. 16a, there is shown a cross-section through a loaf which was removed from the oven after only 5 minutes baking time, and then subjected to the vacuum cooling technique. The crust is very weak, but the crumb is fully formed and is stable outside the zone A. The structure inside the zone A is still a basic dough and is unbaked. The surprising feature of this test is that the whole structure will stand freely without collapse, which must be attributed to the vacuum treatment, because normally the product would simply fall into a shapeless mass. The loaf is useless, because it contains unbaked dough.

The loaf shown in FIG. 16b was removed from the oven after only 10 minutes cooking time and subjected to the vacuum cooling technique and its crust is slightly soft. The crum formation outside the zone B is completely formed, but the strength of the crum between the zones B is weak. Within the zones B, there is still a basic dough, so that the loaf is useless, but again it is self sustaining.

The loaf shown in FIG. 16c was removed from the oven after 15 minutes and subjected to the vacuum cooling technique. It has an acceptable crust and all the dough is all converted to crumb, but the crumb structure is weak at the centre of the loaf, and the product is probably not saleable. The loaf shown in FIG. 16d was removed from the oven after 20 minutes baking time and subjected to the vacuum cooling technique. The crumb structure is now fully formed and also the crust is completely formed. This means that the loaf is in an acceptable condition for further processing such as slicing, and it is also a saleable article. The loaf shown in FIG. 16e was removed from the oven after 25 minutes baking time, that is only 1 minute before the end of the normal baking time and subjected to the vacuum cooling technique, and in all respects, this is extremely similar to the loaf which was removed from the oven after 20 minutes baking time. Finally the loaf shown in FIG. 16f was allowed to stay in the oven, the full normal baking time of 26 minutes and was subjected to the vacuum cooling technique, and of course this loaf is fully formed in respect of its crust and crumb structure.

Whatever may be the theoretical explanation therefore, it can be said without doubt as a result of this experiment that it is possible to substantially shorten the known normal baking time, and to obtain a useful product. On the basis of the experiment, it has provded a practical proposition to remove the loaves from the oven after 21 minutes baking time thus giving almost 20% reduction in the baking time. According to prior art techniques bread of the type referred to in this example must be baked 26 minutes and cooled for at least an hour before slicing and wrapping. With the method of this invention, both baking and cooling may occur in about 22 minutes or even less time than prior art baking alone. Thus total baking and cooling time can be reduced about 74%.

EXAMPLE II

In this experiment, madeira cake was produced having the following ingredients:

| | | |
|---|---|---|
| Cake flour | 15 lb. | 12 oz. |
| Shortening | 3 lb. | 15 oz. |
| Cake Margarine | 3 lb. | 15 oz. |
| Soya Flour | 2 lb. | 8 oz. |
| Sugar | 14 lb. | 8 oz. |
| Frozen egg | 7 lb. | 8 oz. |
| Milk powder | 3 lb. | 7½ oz. |
| Water | 11 lb. | 12 oz. |
| Salt | | 3 oz. |
| Baking powder | | 8 oz. |

Plus egg colour, lemon or butter or vanilla flavouring.

This cake mixture was divided into 12 ounce cakes, and some of these were baked in the oven for the normal known baking time for this type of madeira cake, followed by conventional cooling in atmosphere, whilst others were removed from the oven at various times before the end of the normal baking time, and immediately subjected to vacuum cooling. FIG. 20 shows the conditions apertaining in the cooler, the line 442 indicating the temperature of the cake as sensed by a probe, and the line 444 indicating the pressure during the application of the vacuum. The whole cooling process was completed in 2 minutes, and it will be noted that the curve 444 changes its slope at 446, where after approximately 1 minute pumping at the slow rate, a change was made to pumping at the medium rate.

Referring again to FIG. 19, the cake at the left hand side of this Figure was baked for the complete normal baking time, and then cooled conventionally. The cake shown at the right hand side of the Figure, was removed from the oven, with a 12% reduction in the normal baking time, and then subjected to vacuum cooling. Visually, these cakes appear to be very similar, excepting that it will be noted that the vacuum cooled cake is slightly more open in structure. In fact, there is a further significant advantage. In "Bakery Technology and Engineering" by Matz published by The Avi Publishing Co. Incorporated of West Port, Conn. in 1960 at page 606, there is a discussion of the moisture distribution through the crumb structure of baked farinaceous products. This article shows that the moisture distribution is not even throughout the product, and this has concomitant disadvantages. However, by the use of the vacuum cooling technique of the present invention, it is found that there is a high degree of consistency in the moisture content of the crumb structure throughout the cake. This of course is additional to the advantages of reduced baking time and very much reduced cooling time.

EXAMPLE III

FIG. 21 shows the cross-section through two malt loaves, which were produced from the following ingredients:

| | | |
|---|---|---|
| Malt flour | 7 lb. | 8 oz. |
| Conditioner | 3 lb. | 12 oz. |
| Fruit | 2 lb. | 12 oz. |
| Yeast | | 4 oz. |
| Syrup | | 3½ oz. |
| Caramel | | 3½ oz. |
| Water | 6 lb. | 5 oz. |

The mixture was divided into 10 ounce loaves, which were baked in an oven at 190° C., the normal complete baking time being 65 minutes. Again, some of the loaves were baked for the complete normal baking time, and conventionally cooled, whilst others were removed at various times before the normal complete baking time, and subjected to vacuum cooling. Again, the control on the vacuum cooling was very similar to that with the madeira cake, in that the total cooling time was about 2 minutes, but in this case, the slow rate of pumping was used for 1 minute, the medium rate for 30 seconds, and the full rate for 30 seconds.

The loaf shown at the left hand side of FIG. 21, was allowed to bake for the normal complete baking time, and then conventionally cooled. It will be observed that there is a considerable depression in the top surface of this loaf, and here it must be mentioned, that it is notoriously difficult to obtain a good rectangular cross-sectioned malt loaf, and indeed a loaf such as that shown at the left hand side of FIG. 21, would be considered quite acceptable commercially.

The loaf shown at the right hand side of FIG. 21, was removed from the oven, after 50 minutes, and then vacuum cooled. Hence there was a reduction of about 25% in the baking time. The loaf is properly baked, and moreover has been stabilised in an almost rectangular configuration, which is of course superior to the configuration obtained by the conventional method of baking and cooling.

The malt loaf was kept in the same tin in which it was baked during the cooling process, and the tin helps to maintain the shape of the sides of the loaf, whilst the loaf structure itself is apparently expanding slightly under the influence of the vacuum cooling.

EXAMPLE IV

FIG. 22 shows cross-sections through two meat pies. These are baked products having a pastry type container and lid, with a filling of cooked meat.

The pie shown at the right hand side of FIG. 22 was baked in an oven, and then allowed to cool by the conventional method. The pie shown at the left hand side of FIG. 22 was baked in the oven for the complete normal baking time, but was then immediately subjected to a vacuum cooling in accordance with the invention. The total cooling time was 1 minute 30 seconds of which the first 30 seconds was at the slow rate of pumping, and then the remaining minute at the fast rate of pumping.

It is to be noted that in this experiment, it was not possible to obtain any reduction in the baking time, but there was a very considerable reduction in the cooling time, and it will be also observed from FIG. 22, that the pie cooled by the vacuum cooling technique has a much better shape than the pie cooled by the conventional method, and that the meat contents of the pie more closely adhere to the walls of the pastry container. Thus, there is provided a pie which has a more pleasing appearance, and is therefore a more saleable product.

EXAMPLE V

FIG. 23 shows the cross-sections through two sausage rolls. These consist of sausage meat enveloped in a tube of pastry, and the sausage roll shown at the left hand side of FIG. 23 was baked and cooled by the conventional method, whereas that shown at the right hand side of FIG. 23 was baked and then cooled by the vacuum cooling technique of the present invention. As with the meat pie shown in FIG. 22, it was not possible to obtain any reduction in the baking time, but there was a considerable reduction in the cooling time, and also the vacuum cooled product has a more consistent shape, and its meat content is more open. Consequently the sausage roll produced by the cooling process of the invention, is a more saleable article than that produced by the conventional process.

EXAMPLE VI

FIG. 24 shows the cross-sections through two Vienna Sticks. These are bread products, made from the following ingredients:

| Baker's flour | 18 lb. 10 oz. |
| Cake margarine | 7 lb. 10 oz. |
| Compound fat | 5 lb. 12 oz. |
| Soya flour | 1 lb. 12 oz. |
| Sugar | 8 lb. 3 oz. |
| Milk | 3 lb. 4 oz. |

Add egg colour and vanilla flavour.

This mixture was divided into 7½ ounce sticks, and baked in an oven at a temperature of 213° C. Some of the sticks were removed from the oven at the end of the normal complete baking time, and subjected to conventional cooling, such a stick being illustrated at the left hand side of FIG. 24. Other sticks were removed from the oven at various times before the completion of the normal complete baking time, and then subjected to a vacuum cooling treatment in the test rig. One such stick is shown at the right hand side of FIG. 24, and this was removed from the oven, with a 25% reduction in the normal complete baking time. Nevertheless, the crumb structure and crust are fully formed, and the product is quite saleable. Indeed, it will be observed that as a result of the vacuum cooling technique, the product has been formed into a better geometric shape, than the cross-section of the conventionally baked and cooled product.

However, in this experiment, it proved possible to apply the vacuum at the fast rate throughout the 1 minute cooling time, so that there was no modulation of the application of the vacuum. This illustrates that it is possible to obtain advantages in some instances, by reducing the baking time, followed by prompt submission to a vacuum cooling technique, even though the vacuum cooling does not require special modulation as is necessary in other cases.

I claim:

1. A method of rapidly cooling a freshly baked, moisture containing, farinaceous foodstuff article including the steps of:

transferring the article from an oven in which it was baked to a vacuum cooling chamber; said transferring step being effected sufficiently rapidly to avoid an appreciable modification of the physical characteristics of the article after baking and prior to cooling;

cooling said article by applying vacuum thereto in said chamber to extract moisture from the article said cooling step being initiated at substantially a level of vacuum slightly below the saturated vapour pressure coinciding with the oven discharge temperature of the article; and deliberately changing said gas extraction rate of said system for applying vacuum during the application of the vacuum, in response to a predetermined level of a physical property of the gases in said chamber, to control the moisture extraction rate from the article.

2. A method of rapidly cooling a freshly baked, moisture containing farinaceous foodstuff article as claimed in claim 1, wherein said deliberate changing of the gas extraction rate is achieved by reducing the impedance of the gas extraction system utilized to thereby increase said gas extraction rate of said system.

3. A method of rapidly cooling freshly baked, moisture containing, farinaceous foodstuff articles according to claim 1, wherein cooling by application of said vacuum is initiated and completed within no more than 3.5 minutes.

4. A method of rapidly cooling a feshly baked, moisture containing farinaceous foodstuff article including the steps of:

transferring the article from an oven in which it was baked to a vacuum cooling chamber; said transferring step being effected sufficiently rapidly to avoid an appreciable reduction in temperature of the article after baking and prior to cooling;

cooling said article by applying vacuum thereto in said chamber to extract moisture from the article, said cooling step being initiated at substantially a level of vacuum slightly below the saturated vapour pressure coinciding with the oven discharge temperature of the article; and deliberately changing said extraction rate of said system for applying vacuum during the application of the vacuum, in response to a predetermined level of a physical property of the gases in said chamber, to control the moisture extraction rate from the article.

5. A method of rapidly cooling a freshly baked, moisture containing farinaceous foodstuff article as claimed in claim 4, wherein said deliberate changing of the gas extraction rate is achieved by reducing the impedance of the gas extraction system utilized to thereby increase said gas extraction rate of said system.

6. A method of producing a freshly baked, moisture containing farinaceous foodstuff article, having predetermined physical and chemical characteristics including at least a heating step and a cooling step, comprising the steps of:

determining the normal heating time required to produce the given article with said given physical and chemical characteristics by heating followed by cooling in normal atmospheric conditions;

heating an uncooked mass of said foodstuff, but terminating said heat so that heating is for an appreciably less time than the determined normal heating time; and submitting said article to a vacuum cooling process whereby a completely baked and cooled article is obtained, which is in all essential physical and chemical characteristics identical with said required given article produced by said heating and cooling in normal atmospheric conditions.

7. A method of producing a baked, moisture containing farinaceous foodstuff article comprising the steps of:

heating an uncooked mass of said foodstuff only to a point at which starch gelantinisation and gluten coagulation have commenced but have not been fully completed, so that said article would physically collapse if submitted to cooling in normal atmospheric conditions;

terminating heating of said article at said point; and submitting said article to a vacuum cooling process, whereby starch gelatinisation and gluten coagulation are completed under vacuum to produce a completely cooked and cooled product.

8. A method of rapidly cooling a freshly baked, moisture containing, farinaceous foodstuff article to thereby produce a completely cooked and cooled product wherein an uncooked mass of said foodstuff has been heated only to a point at which starch gelatinisation and gluten coagulation have commenced but have not been fully completed, so that said article would physically collapse if submitted to cooling in normal atmospheric conditions and such heating has been terminated, said rapidly cooling method comprising the steps of:

transferring the article to a vacuum cooling chamber; said transferring step being effected sufficiently rapidly to avoid an appreciable modification of the physical characteristics of the article after heating and prior to cooling;

cooling said article by applying vacuum thereto in said chamber to extract moisture from the article said cooling step being initiated at substantially a level of vacuum slightly below the saturated vapour pressure coinciding with the oven discharge temperature of the article; and deliberately changing said gas extraction rate of said system for applying vacuum during the application of the vacuum, in response to a predetermined level of a physical property of the gases in said chamber, to control the moisture extraction rate from the article.

9. A method of producing a baked, completely cooked and cooled moisture containing farinaceous foodstuff article comprising the steps of:

heating an uncooked mass of said foodstuff only to a point at which starch gelantinisation and gluten coagulation have commenced but have not been fully completed, so that said article would physically collapse if submitted to cooling in normal atmospheric conditions;

terminating heating of said article at said point;

transferring the article from an oven in which it was baked to a vacuum cooling chamber; said transferring step being effected sufficiently rapidly to avoid an appreciable modification of the physical characteristics of the article after baking and prior to cooling;

cooling said article by applying vacuum thereto in said chamber to extract moisture from the article said cooling step being initiated at substantially a level of vacuum slightly below the saturated vapour pressure coinciding with the oven discharge temperature of the article; and deliberately changing said gas extraction rate of said system for applying vacuum during the application of the vacuum, in response to a predetermined level of a physical property of the gases in said chamber, to control the moisture extraction rate from the article.

10. A method of completely cooking a farinaceous foodstuff article comprising the steps of:

heating an uncooked mass of said foodstuff material for at least 70% but not more than 88% of the time that would be required for complete cooking to effect partial cooking; and completing the cooking while subjecting the partially uncooked mass to controlled vacuum cooling.

* * * * *